United States Patent Office 3,503,628
Patented Mar. 31, 1970

3,503,628
BAYONET TYPE TRAILER HITCH TONGUE AND COUPLER ASSEMBLY
Robert D. Lowry and Russell B. Strout, Winchester, Mass., assignors to Lowry Development Corporation, Winchester, Mass., a corporation of Massachusetts
Filed Mar. 26, 1968, Ser. No. 716,171
Int. Cl. B60d 1/00, 1/06
U.S. Cl. 280—491         4 Claims

ABSTRACT OF THE DISCLOSURE

A trailer hitch has a short coupler for attachment to a tongue permanently mounted on the rear end of a driving vehicle and presenting on its rear portion the conventional ball for attachment of the trailer. The coupler is disengageable. The tongue has a bayonet slot for receiving an upstanding pin on the coupler and the tongue and coupler are locked together by a relative angular rotation and are held in aligned rotated position by suitable securing means.

---

This invention relates to trailer hitches and more particularly to a hitch which does not permanently mount the conventional upstanding ball at the rear of an automobile or tractor, but mounts it rather on the rear end of a separate coupler which may be readily attached to and detached from a simple flat tongue which is permanently mounted on the rear end of the driving vehicle, which tongue need not extend much, if at all, beyond the normal rear end of the vehicle.

Present day trailer hitch accessories which carry a ball and are permanently attached to the driving vehicle have to extend far enough beyond the rear of the vehicle to permit the socket on the trailer bar to pass freely over the ball. Such an extension is dangerous to pedestrians, can be readily damaged in a rear end bump and may often be illegal under state laws when the upstanding ball visually obstructs a rear centrally mounted license plate when the trailer is not hitched.

In accordance with the present invention the ball, instead of being mounted on a permanently attached vehicle part, is mounted on a separate part which acts as a short coupler between a permanently mounted flat tongue on the driving vehicle and the socket of the trailer. The short coupler then may be readily removed and carried in the trunk or elsewhere in the vehicle when not in use, thus only leaving a non-obtrusive flat tongue at the rear of the car which is well below the license plate and does not visually block it from view.

A trailer hitch using such an unobtrusive tongue in assembly with a coupler of this invention is shown in the accompanying drawings wherein.

Figure 1:
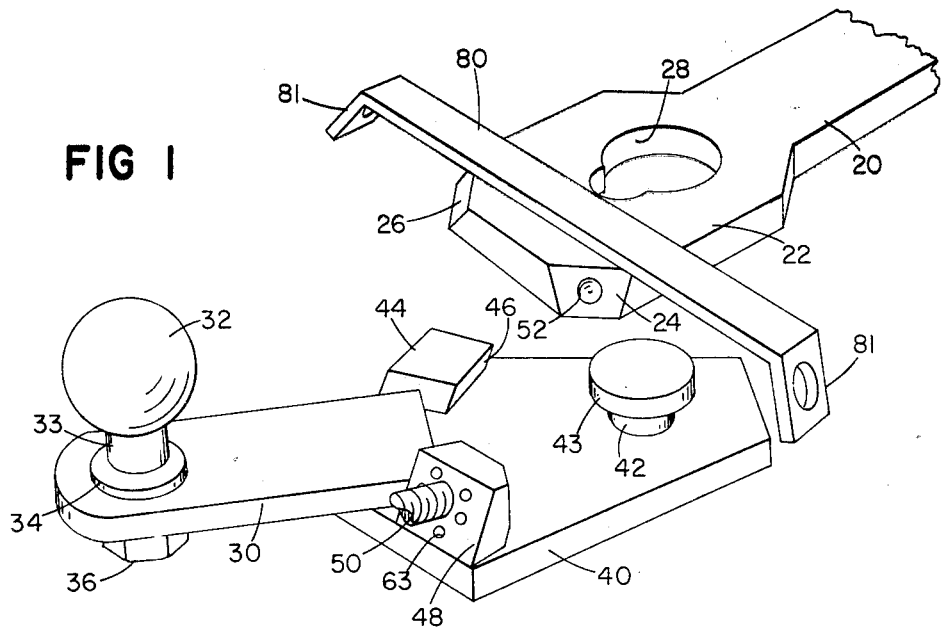
FIG. 1 is a perspective view of the tongue and coupler in positions where they are about to be assembled together.

The tongue which is permanently attached to the vehicle is shown at 20 and has an enlarged rear portion 22 whose rear corners 24 and 26 respectively are truncated and beveled upwardly. A bayonet type opening 28 pierces the portion 22.

The coupler includes a rear section 30 on which is permanently mounted a conventional trailer hitch ball 32 which may be carried on top of a pin 33 having an enlarged collar 34 and a screw threaded bottom end for insertion through a hole 35 in the rear section 30 and engagement by a nut 36.

Figure 2:
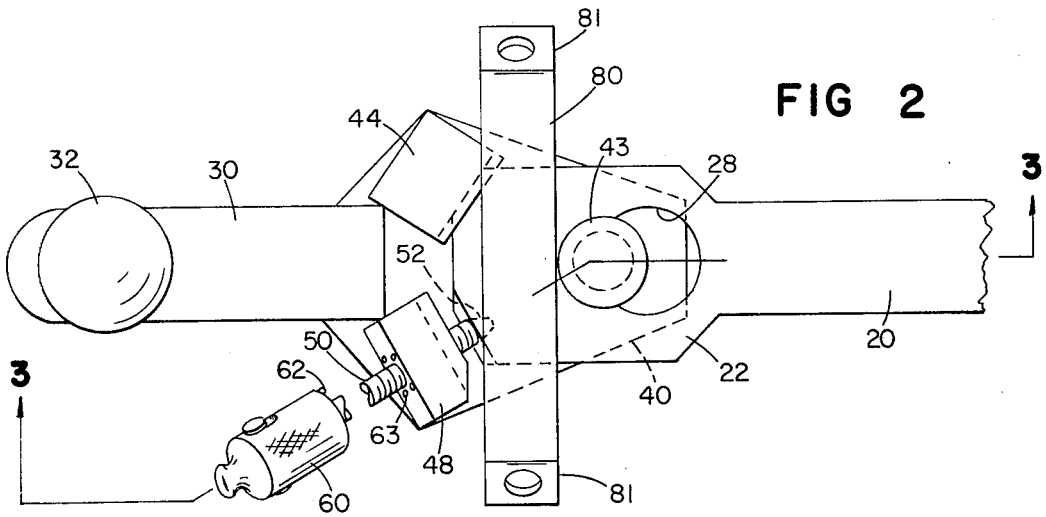
FIG. 2 is a plan view of the assembled device.
Figure 3:
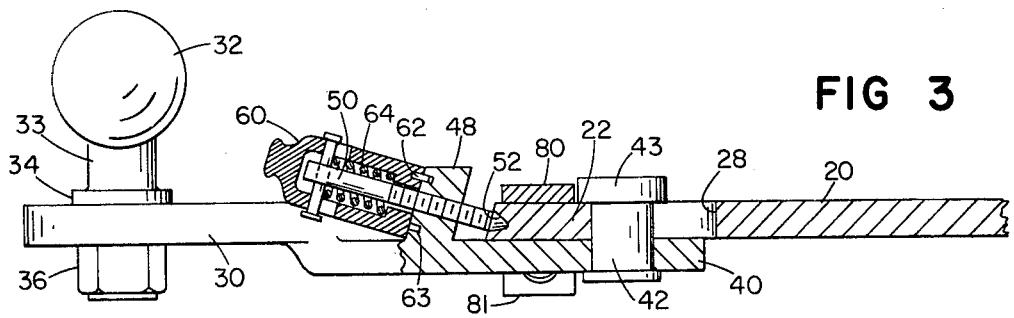
FIG 3 is a cross sectional view of the device shown in FIG. 2 taken along the line 3—3 in FIG. 2.

The forward section 40 of the coupler is diamond shaped and carries a fixed headed hitch pin 42, its head 43 being small enough to permit insertion upwardly through the bayonet type aperture 28 and its height being great enough to permit its head 43 to clear the top surface of the tongue as the tongue and coupler are pulled away from each other as shown in FIGS. 2 and 3.

On one side of the plate 40, as shown in FIG. 1, is a block 44 having an undercut inner surface 46. On the other side of the plate 40 is another block 48 which is screw-threaded to receive a bolt 50 positioned to be received by a depression 52 in the rear corner wall 24 of the tongue 20 when the parts are in alignment as shown in FIG. 2.

The dimensions of the parts are such that when in angular position with respect to each other as indicated in FIG. 1, the headed pin 42 may be passed up through the aperture 28 and then after the parts are moved away from each other as permitted by the bayonet type aperture 28, the coupler may be rotated about pin 42 relative to the tongue into alignment therewith with the edge 26 of the tongue passing under the undercut edge 46 of block 44. When in alignment the screw 50 may be tightened to seat in the depression 52 and hold the parts from becoming disaligned.

As shown in FIGS. 2 and 3 a conventional lock may be placed on the bolt 50—for example a hollow cap 60 which has a cross pin piercing the bolt 50 and provided at its bottom with a pin or pins 62 which are received in depression 63 in the block 48 so as to hold the bolt against inadvertent rotation. A spring 64 holds the cap 60 down except when lifted to turn bolt 50.

The tongue 22 may have affixed to its top surface, by welding or bolts, a cross yoke 80 with downwardly bent ends having apertures for affixing a safety chain.

What is claimed is:
1. A disengageable trailer hitch assembly comprising
   a tongue adapted to be permanently mounted on the rear of a vehicle,
   said tongue having a vertical bayonet type aperture extending therethrough and a wedge shaped rear end portion,
   a coupler including a plate member having at its rear end an upstanding trailer hitch ball and at its forward end an upstanding headed pin adapted to be lifted upwardly into said bayonet aperture when said tongue and plate member are at a disaligned angle relative to one another, and
   co-operating camming means on said plate and said tongue for moving said members away from one another as said members are brought from disaligned to aligned position to move said pin into the slot portion of said bayonet aperture with its head maintaining said parts against vertical separation, and
   means for locking said tongue and plate member in aligned position.
2. An assembly as claimed in claim 1 including means for restraining the rear end of said tongue in aligned position against vertical motion relative to said plate.

3. An assembly as claimed in claim 1 having a bracket on said plate, a screw threaded through said bracket and movable into engagement with said tongue to retain said tongue and plate member from moving out of alignment.

4. An assembly as claimed in claim 1 wherein the rear end of said tongue has converging walls and said coupler has an undercut wall forming a socket into which one of the tongue walls is received as said tongue and plate member are moved from disaligned angular position into aligned position.

References Cited

UNITED STATES PATENTS

| | | | |
|---|---|---|---|
| 2,622,892 | 12/1952 | Lowman | 280—495 |
| 2,685,468 | 8/1954 | Blocker et al. | 280—491 X |
| 2,856,204 | 10/1958 | Graham | 280—491 |
| 2,877,025 | 3/1959 | Jay | 280—495 |

LEO FRIAGLIA, Primary Examiner

U.S. Cl. X.R.

280—495